May 10, 1938.    W. ELENBAAS ET AL    2,116,742
GASEOUS ELECTRIC DISCHARGE DEVICE
Filed July 28, 1936
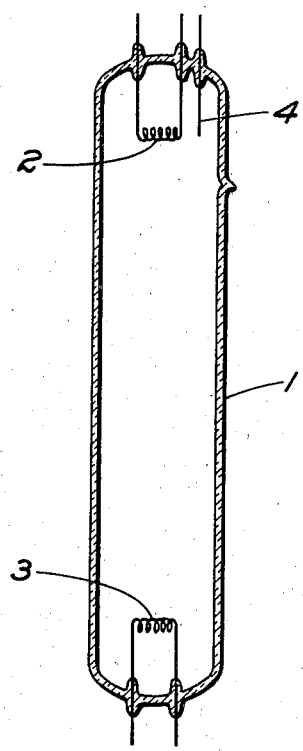
INVENTORS
Willem Elenbaas
Gottfried Bruno Jonas
BY *Harry E. Dunham*
ATTORNEY Patented May 10, 1938

2,116,742

UNITED STATES PATENT OFFICE 2,116,742

GASEOUS ELECTRIC DISCHARGE DEVICE

Willem Elenbaas and Gottfried Bruno Jonas, Eindhoven, Netherlands, assignors to General Electric Company, a corporation of New York Application July 28, 1936, Serial No. 93,114
In Germany August 6, 1935

4 Claims. (Cl. 176—122)

The present invention relates to gaseous electric discharge devices generally and more particularly the invention relates to such devices containing a quantity of cadmium the vapor of which is light emitting during the operation of the device.

Ionized cadmium vapor is a chemically active material and attacks the glasses customarily used as container glasses for incandescent lamps and gaseous electric discharge lamps containing rare gases, such as lead or lime glasses. Cadmium vapor not only emits visible radiation when excited to luminescence by the passage of an electric discharge therethrough but also emits ultra violet rays.

The object of the present invention is to provide a long lived gaseous electric discharge lamp the gaseous atmosphere of which consists of or comprises cadmium vapor. Another object of the invention is to provide an ultra-violet ray transmitting glass which is resistant to chemical attack by hot, ionized cadmium vapor. Still further objects and advantages attaching to the device and to its use and operation will be apparent to those skilled in the art from the following particular description.

We have discovered that a glass which is chemically stable in the presence of hot, ionized cadmium vapor, which has a high softening temperature and which transmits ultra-violet rays is one containing between

|  | Percent |
|---|---|
| Silica (SiO$_2$) | 55 to 78 |
| Alumina (Al$_2$O$_3$) | 12 to 23 |
| Calcium oxide (CaO) | 10 to 30 |

Particularly good glasses are those having the following compositions:—

|  | I | II | III |
|---|---|---|---|
|  | Percent | Percent | Percent |
| Silica (SiO$_2$) | 78 | 57 | 55 |
| Alumina (Al$_2$O$_3$) | 12 | 23 | 15 |
| Calcium oxide (CaO) | 10 | 20 | 30 |

In the drawing accompanying and forming part of this specification a gaseous electric discharge device having a container of glass of the present invention is shown in a front elevational, partly sectional view.

Referring to the drawing the gaseous electric discharge device comprises a tubular container 1 having main electrodes 2 and 3 sealed therein at each end thereof and an auxiliary, starting electrode 4 mounted adjacent said main electrode 2. Said electrodes 2 and 3 consist of a coiled metal filament, such as a tungsten filament, having a body of electron emitting material associated therewith, such as barium oxide, and are electron emitting when heated. Said container 1 has a starting gas therein, such as argon, neon or xenon, or a mixture of such gases at a pressure of approximately 1 to 10 mm. and a quantity of cadmium therein the vapor of which is light emitting during the operation of the device.

Said container 1 consists of a silicate glass which is free from boric oxide and alkali and which has the following composition.

|  | Percent |
|---|---|
| Silica (SiO$_2$) | 55 |
| Alumina (Al$_2$O$_3$) | 15 |
| Calcium oxide (CaO) | 30 |

A glass having the above composition is practically immune to chemical attack by cadmium vapor, has a high softening temperature and transmits the visible and ultra-violet light emitted by said vapor during the operation of the device.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, said container 1 is mounted in a heat conservator, such as an evacuated envelope, or a Dewar flask, when desired.

What we claim as new and desire to secure by Letters Patent of the United States is:—

1. An electric discharge device comprising a container, electrodes sealed therein, a gaseous atmosphere therein comprising cadmium vapor, said container comprising an ultra violet ray transmitting glass chemically stable in the presence of said vapor, consisting of composition:

|  | Percent |
|---|---|
| Silica (SiO$_2$) | 55 to 78 |
| Alumina (Al$_2$O$_3$) | 12 to 23 |
| Calcium oxide (CaO) | 10 to 30 |

2. An electric discharge device comprising a container, electrodes sealed therein, a gaseous atmosphere therein comprising cadmium vapor, said container comprising an ultra violet ray transmitting glass, chemically stable in the presence of said vapor, having the following composition:

|  | Percent |
|---|---|
| Silica (SiO$_2$) | 78 |
| Alumina (Al$_2$O$_3$) | 12 |
| Calcium oxide (CaO) | 10 |

3. An electric discharge device comprising a container, electrodes sealed therein, a gaseous atmosphere therein comprising cadmium vapor, said container comprising an ultra violet ray transmitting glass, chemically stable in the presence of said vapor, having the following composition:

| | Percent |
|---|---|
| Silica ($SiO_2$) | 57 |
| Alumina ($Al_2O_3$) | 23 |
| Calcium oxide (CaO) | 20 |

4. An electric discharge device comprising a container, electrodes sealed therein, a gaseous atmosphere therein comprising cadmium vapor, said container comprising an ultra violet ray transmitting glass, chemically stable in the presence of said vapor, having the following composition:

| | Percent |
|---|---|
| Silica ($SiO_2$) | 55 |
| Alumina ($Al_2O_3$) | 15 |
| Calcium oxide (CaO) | 30 |

WILLEM ELENBAAS.
GOTTFRIED BRUNO JONAS.